United States Patent
Nerwin

[15] 3,659,511

[45] May 2, 1972

[54] ASSEMBLAGE AND PACK OF SELF-PROCESSING PHOTOGRAPHIC FILM UNITS

[72] Inventor: Hubert Nerwin, Rochester, N.Y.

[73] Assignee: Eastman Kodak Company, Rochester, N.Y.

[22] Filed: July 2, 1970

[21] Appl. No.: 52,026

[52] U.S. Cl. ..................................................95/13, 95/22
[51] Int. Cl. ........................................................G03b 17/50
[58] Field of Search ..............................95/13, 19, 22; 96/76

[56] References Cited

UNITED STATES PATENTS

| | | | |
|---|---|---|---|
| 2,554,889 | 5/1951 | Wolff | 95/13 |
| 3,113,496 | 12/1963 | Eburn et al. | 95/13 |
| 2,930,299 | 3/1960 | Land | 95/13 |
| 1,792,295 | 2/1931 | Gaseltine | 95/22 |

Primary Examiner—Samuel S. Matthews
Assistant Examiner—Fred L. Braun
Attorney—Robert W. Hampton and J. Addison Mathews

[57] ABSTRACT

A film-assemblage and pack containing a plurality of self-processing film units adapted to be exposed and processed in sequence. Each film unit includes a first or photosensitive sheet and a second or process sheet, which sheets are separated during exposure and are brought into superposition for removal from the camera and for processing. The film units are connected within the assemblage or pack by an arrangement of leaders, only one of which is accessible from the camera exterior after each exposure. Superpositioning, processing and withdrawal of the sheets is effected through a "lost-motion" type of connector that first permits and then prevents relative movement between the sheets as a respective leader is withdrawn from the camera. Simultaneously with such withdrawal, the leader associated with the next successive film unit automatically is brought into the position where it will be accessible from the camera exterior for the next exposure and processing sequence.

11 Claims, 13 Drawing Figures

HUBERT NERWIN
INVENTOR.

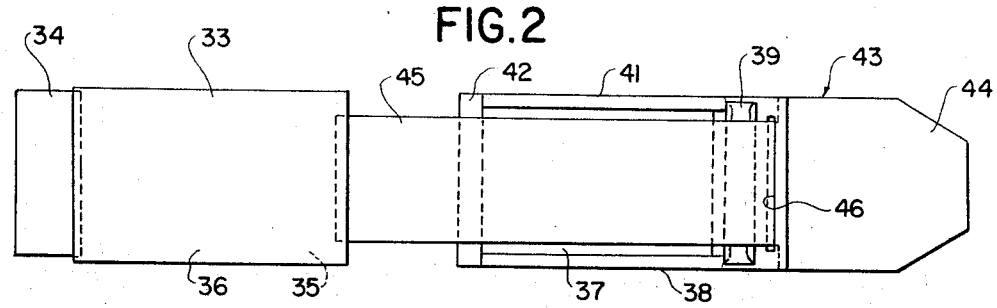
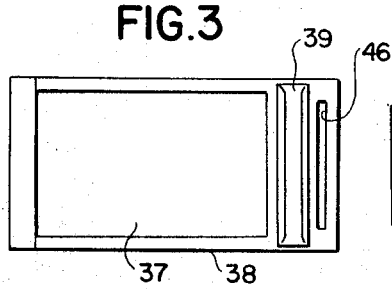
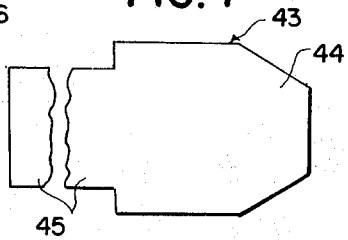
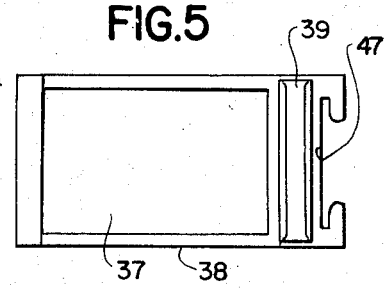
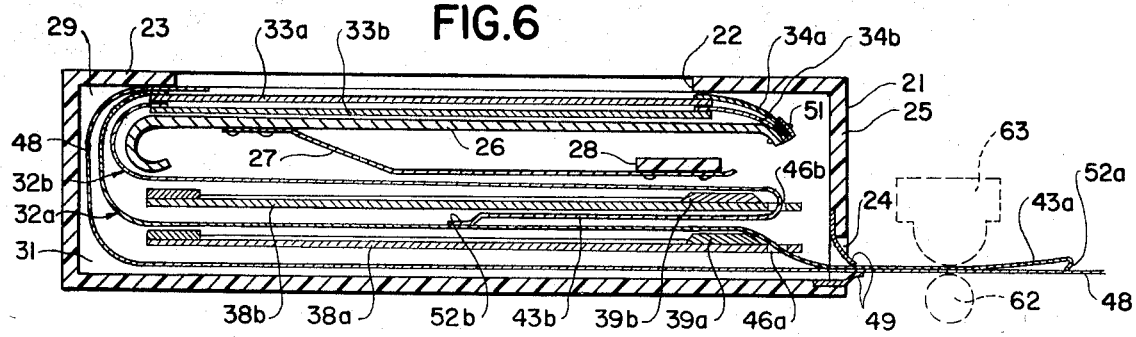
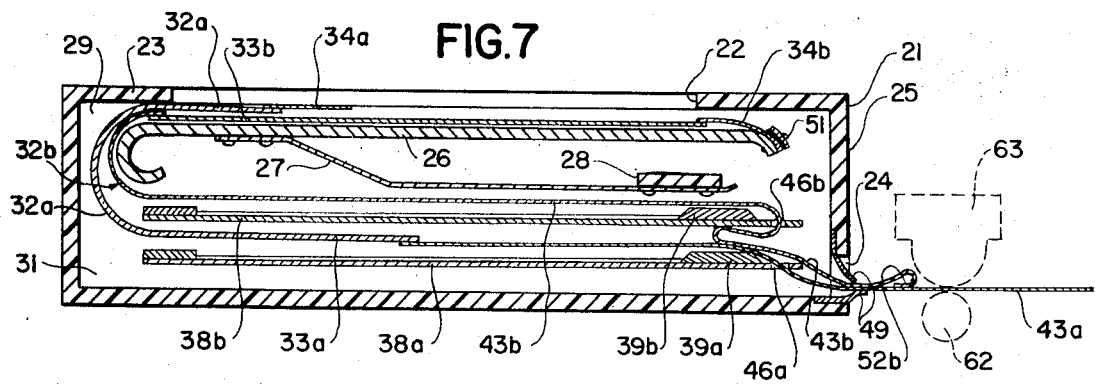
HUBERT NERWIN
INVENTOR.
BY J. Addison Mathew
Robert W. Hampton
ATTORNEYS Patented May 2, 1972
3,659,511
3 Sheets-Sheet 3
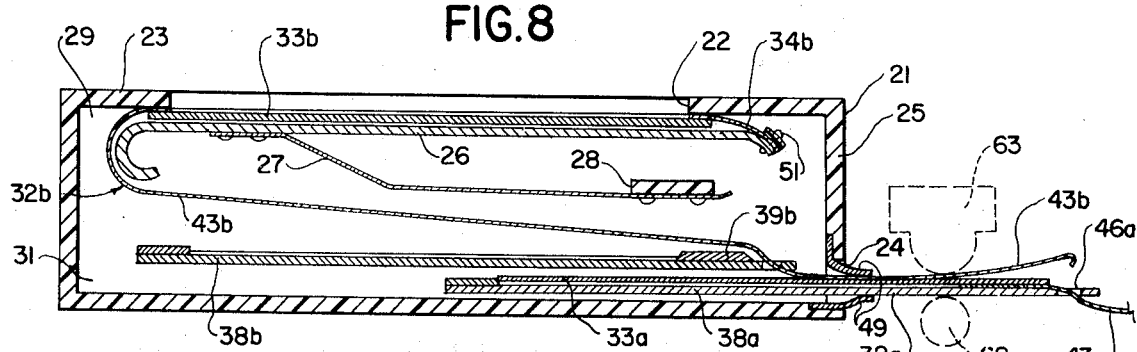
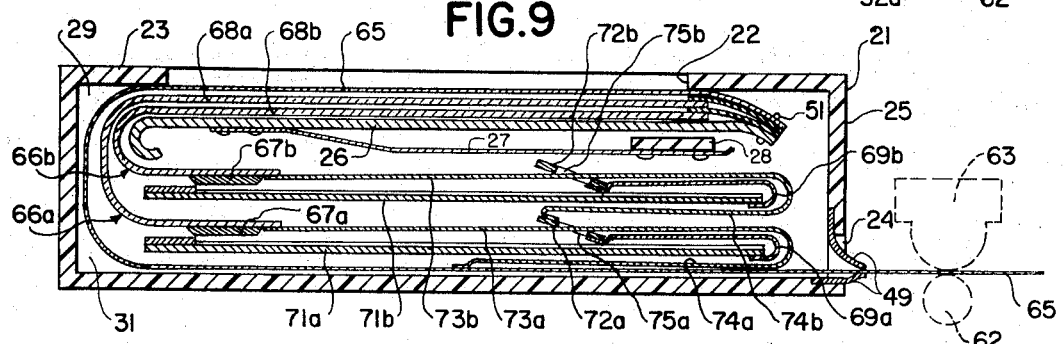
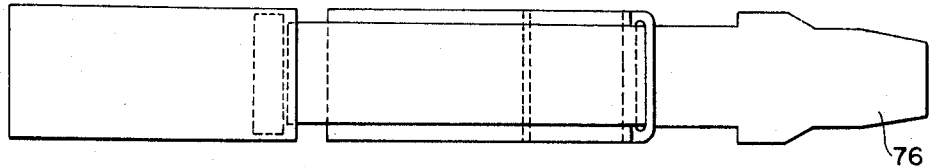
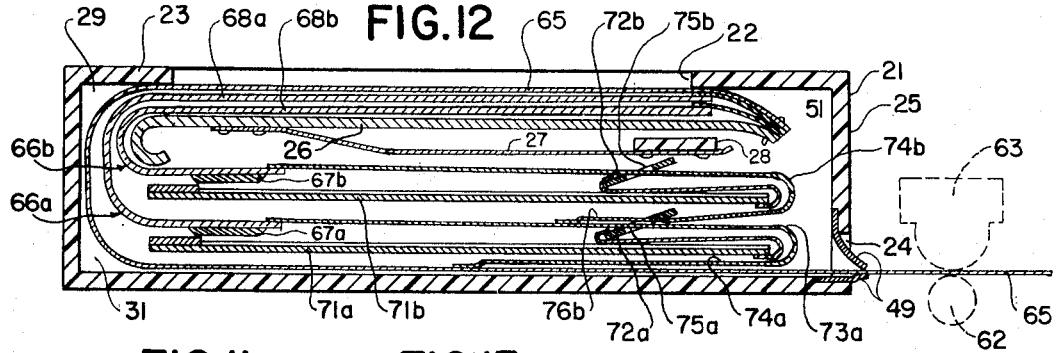
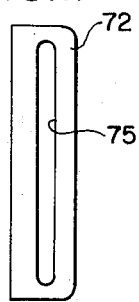
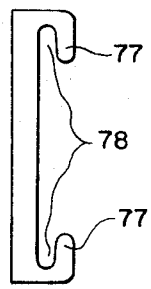
HUBERT NERWIN
INVENTOR.
BY J. Addison Mathew
Robert W. Hampton
ATTORNEYS

ASSEMBLAGE AND PACK OF SELF-PROCESSING PHOTOGRAPHIC FILM UNITS

BACKGROUND OF THE INVENTION

1. Field of the Invention

The present invention relates to photography and more particularly to self-processing film units and to film assemblages and/or packs containing a plurality of such units.

2. Description of the Prior Art

Assemblages or packs of self-processing film units are well known in the photographic art and generally comprise a plurality of film units each including a photosensitive sheet, an image transfer or receiving sheet, and a rupturable pod of processing fluid positionable between the sheets. The photosensitive and transfer sheets initially are arranged in separate stacks in one or more camera chambers, with the photosensitive sheets arranged behind the objective for successive exposure and for transport into superposition with a corresponding transfer sheet. The resulting sandwich then is removed from the camera between a pair of juxtaposed pressure applying members that rupture the pod and distribute the processing fluid, thus initiating development of the exposed photosensitive sheet and effecting migration of the developed image to the transfer sheet.

Early types of such film assemblages and packs, as disclosed for example in U.S. Pat. No. 2,669,168, issued in the name of E. H. Land on Feb. 16, 1954, included a plurality of externally accessible sequentially numbered pulling leaders for superposing the photosensitive and transfer sheets and for removing the resulting unit or sandwich from the camera. Each pulling leader was coupled to a photosensitive sheet and was threaded through an opening in the leading end of a corresponding transfer sheet to provide a lost-motion type connection between the sheets. With such a connection, pulling a selected leader from the camera first advances one of the sheets relative to the other, until they are brought into registration, and then moves both of the sheets as a unit through the pressure applying members and from the camera.

While the above type of assemblage has certain advantages and is believed satisfactory for its intended purpose, it also suffers from many disadvantages. By way of example only, a plurality of leaders extend from the camera at most times during its operation, and such an arrangement invariably either interferes with the effective operation of the pressure applying means, or requires a complicated and separate set of such pressure means for each film unit. Moreover, the problem of multiple leaders between the rollers may be even further aggrevated because the number of such leaders changes as the units are exposed and processed, thus making it difficult to maintain the applied pressure constant for all the film units. Additionally, since all the leaders always are accessible outside the camera, accidents are bound to occur where the photographer accidentally withdraws the wrong leader, wasting the corresponding film unit and possibly jamming or otherwise damaging the remaining units.

Of course, other similar units and assemblages have been designed that do not suffer from all of the above problems. In U.S. Pat. No. 2,947,816, issued Feb. 14, 1950 in the name of J. Greenbalgh et al., connectors of the lost-motion type are disclosed wherein no more than one such leader is accessible from the camera exterior at any particular time. However, these other types also present many problems often even more unacceptable than those described above. In the above-mentioned U.S. Pat. No. 2,947,816, for example, manually threading of the next successive leader is necessary after each exposure and processing operation.

More recent film packs have attempted to eliminate these and other problems by means of a system requiring two leaders or pulling operations for each film unit. As shown for example in U.S. Pat. No. 3,080,805 issued in the name of J. A. Hamilton on Mar. 12, 1963, removal of each film unit in such a pack causes a supplemental leader or tab of the next film unit to emerge partially from the camera. After one of the photosensitive sheets is exposed, an accessible supplemental leader or pull tab is withdrawn manually and in turn moves a primary leader of that film unit between a single set of pressure applying members to a position accessible from the camera exterior. By then grasping and pulling on the primary leader, the exposed photosensitive and transfer sheets are withdrawn from the camera to initiate processing, and, simultaneously, the supplemental leader or pull-tab of the next film unit automatically is brought into the aforementioned accessible position. This type of film construction eliminates many problems associated with a multiplicity of leaders always extending from the camera, but increases the number and complexity of film and camera components and poses additional assembly problems associated with interleaving the supplemental leaders between the film units. Furthermore, it requires a somewhat confusing manipulation of two different types of leaders for each film unit, and adds to the waste pieces that must be discarded after each exposure.

SUMMARY OF THE INVENTION

It is an object of the present invention to overcome most or all of the abovementioned problems by providing a film assemblage and pack wherein only one leader need extend through the camera pressure applying means at the time the leader is grasped to advance a film unit.

It is a further object of the present invention to provide such an assemblage or pack wherein withdrawal of one unit from the camera automatically positions a leader of the next successive unit between the pressure means and preferably in a position accessible from the camera exterior.

Still a further object is to provide such a film unit wherein the number of leaders between the pressure means at the time the units are advanced therethrough is constant regardless of the remaining number of units in the assemblage.

In accordance with a preferred embodiment of the present invention, a film assemblage or pack includes units each having a first or photosensitive element and a second process or cover element interconnected by leaders for successively registering or superposing the elements and for transporting the elements preferably to the camera exterior for processing. Each leader is attached to one of the two film elements and extends therefrom through an opening, such as a cut-out portion or slot, in the other or corresponding element to provide a "lost-motion" type of connection therebetween. Through this connection the leader is adapted for moving one of the elements relative to the other until they are brought into registration and then for transporting the elements in unison as an integrated sandwich or unit. As each unit is pulled from the assemblage the leader of the next successive unit automatically is advanced to a position extending from the assemblage where it can be grasped to advance and superpose the elements of the next successive unit. Positioning of each successive leader between camera pressure members thus may be effected automatically, without manipulation of a supplemental leader, and only one leader need be made available extending from between the pressure members at the time that one leader is grasped to advance a film unit. Moreover, the number of leaders extending between the members is constant during withdrawal of the units regardless of the number of units remaining in the assemblage. Thus, effective operation of the members is not prejudiced by a progressively decreasing plurality of leaders between members.

Various means for practicing the invention and other advantages and novel features thereof will be apparent from the following detailed description of illustrative preferred embodiments of the invention, reference being made to the accompanying drawings in which like reference characters denote like elements.

BRIEF DESCRIPTION OF THE DRAWINGS

In the drawings:

FIG. 2 is a plan view of one of the film units incorporated in the film pack depicted in FIG. 1;

FIG. 3 is a plan view of the second or process sheet of the film unit shown in FIG. 2;

FIG. 4 is a fragmentary plan view of the pulling leader of the film unit shown in FIG. 2;

FIG. 5 is a plan view of an alternate second sheet embodiment corresponding generally to the one shown in FIG. 3;

FIG. 6 is a cross-sectional view of the film pack illustrated in FIG. 1 showing the mask or dark slide in the process of being withdrawn;

FIG. 7 corresponds to FIG. 6 and shows the film pack with the photosensitive sheet of the first available film unit partially moved to the position at which it is superimposed with the corresponding cover sheet;

FIG. 8 corresponds to FIGS. 6 and 7 and shows the sandwiched photosensitive and second sheets of the first available film unit being withdrawn together from the film pack;

FIG. 9 is a cross-sectional view of a film pack comprising an alternate embodiment of the invention;

FIG. 10 is a plan view of a film unit of the film pack shown in FIG. 9;

FIG. 11 is an enlarged plan view of one of the slot members incorporated in the film unit shown in FIG. 10;

FIG. 12 is a cross-sectional view of another version of a film pack of the same general type shown in FIGS. 9–11; and FIG. 13 is a plan view of an alternate form of slot member for use in the film pack depicted in FIG. 12.

DESCRIPTION OF THE ILLUSTRATIVE PREFERRED EMBODIMENT

Figure 1:
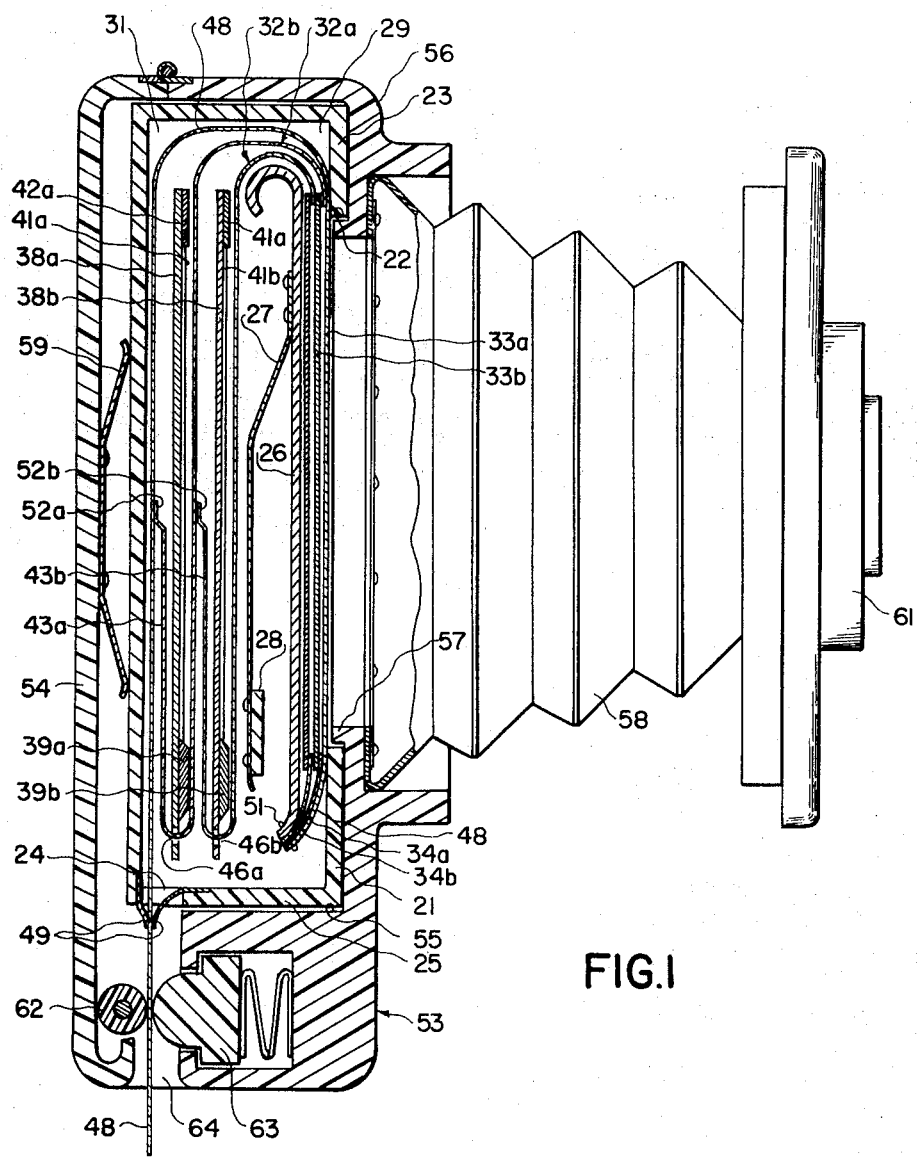
FIG. 1 is a schematic cross-sectional view of a camera loaded with a self-processing film pack in accordance with the present invention.

The illustrative film pack shown in FIGS. 1–8 of the accompanying drawings comprises a rigid generally rectangular casing 21 provided with a rectangular exposure opening 22 in its front wall 23 and with an elongate slot 24 in its end wall 25. A flat pressure plate 26 is supported within the casing behind exposure opening 22 and is biased toward the front wall of the casing by a resilient leaf spring 27 attached to a stationary support member 28; thereby dividing the interior of the casing into a first or front compartment 29 and a second or back compartment 31.

For explanatory purposes, the film pack illustrated in FIGS. 1–8 is shown initially loaded with only two film units 32a and 32b, but it should be apparent that more than two such film units would normally be provided and that they would be contained more compactly in a forward to rearward direction than shown in the drawings. The two film units are substantially identical except perhaps for the lengths of their pulling leaders and are shown with their respective components identified by the same reference numerals followed by either the suffix a or b to designate the corresponding film unit 32a and 32b.

As illustrated in FIGS. 2, 3, and 4, each film unit includes a first or photosensitive sheet 33 provided with a short trailing strip 34 and with a photosensitive front surface 35 opposite its back surface 36 shown in FIG. 2. After the photosensitive front surface of each sheet 33 has been exposed, that sheet is moved so that its exposed front surface is in face-to-face relation with the front surface 37 of a cover, process or second sheet 38 of the same film unit. The front surface of each cover sheet, in turn, is provided with a rupturable processing-fluid pod 39, a frame member or mask 41 and a fluid trap or absorber pad 42. The two sheets 33 and 38 are adapted to be moved into registration or superposition between a pair of pressure members which will exert sufficient pressure on pod 39 to rupture the pod and distribute the processing fluid between the sheets in the region thereof bounded by the frame member and the absorption pad, the latter being adapted to absorb or trap excess processing fluid.

As previously mentioned, the processing fluid initiates development of the image on the exposed photosensitive surface and causes the image to transfer to a receiving or mordant layer in either the photosensitive or cover sheet to provide the finished photograph. More detailed explanations of the construction and functions of the various elements comprising the illustrative photosensitive sheets and cover sheets have been omitted from the present disclosure inasmuch as such details are not necessary to understanding the present invention and are readily available from a number of patents or applications relating to analogous self-processing film units, for example, copending U.S. patent application Ser. No. 869,189 titled PHOTOGRAPHIC FILM UNIT FOR DIFFUSION TRANSFER PROCESSING filed on Oct. 24, 1969, now abandoned, in the name of C. R. Barr et al., and the above-mentioned U.S. Pat. No. 3,080,805.

As shown at numeral 43 in FIGS. 2 and 4, each film unit includes a paper pulling leader or tab comprising a leading end portion 44 and an elongate trailing tongue 45 which is connected to the leading end of the corresponding photosensitive sheet and projects through a transverse slot or cut-out 46 in the leading end of the corresponding cover or process sheet. Accordingly, it will be apparent that the pulling leader can draw the photosensitive sheet toward the cover sheet without moving the latter until the photosensitive sheet is superimposed with the cover sheet, whereupon both sheets can be pulled together by the pulling leader due to the fact that the leading end of the photosensitive sheet is too wide to pass through slot 46 in the cover sheet. Alternately, as shown in FIG. 5, the cover member can be formed with a modified form of transverse of C-slot 47 that is open at the center of the leading end of that sheet, thereby achieving the same lost motion connection between the two sheets but allowing the cover sheet to be assembled to the pulling leader after the leader has been attached to the photosensitive sheet. Such a design is permitted by the fact that little strength is added to the connection by the cover sheet portions defining the middle of slot 46. Thus, it has been found that the modified slot illustrated in FIG. 5 provides approximately as strong a connection as that of FIGS. 2 and 3.

When the film pack is initially assembled, as shown in FIG. 1, the two film units are folded together with an opaque paper mask strip 48 and are installed in the film pack casing with the two photosensitive sheets facing forwardly in the front casing compartment and with the two cover sheets facing forwardly in the back casing compartment. Opaque mask strip 48 is substantially the same width as sheet 33 and completely obscures the exposure opening 22 to prevent light from entering the film pack casing through that opening. Beyond the exposure opening, the leading portion of the mask strip extends around the interior of the casing and projects through slot 24 therein between two flexible light barrier strips 49. The trailing end of the mask strip and the corresponding ends of trailing strips 34a and 34b are attached to pressure plate 26 by a staple 51 to temporarily maintain them in their respective positions shown in FIG. 1. Initially, the leading end portion 44 of pulling leader 43a is folded between cover sheet 38a and the adjacent portion of mask strip 48 and is connected at its tip to the latter by a pressure sensitive adhesive or the like to provide a separable or strip joint of connection 52a. Similarly, the leading end of pulling leader 43b is folded between cover sheet 38b and the adjacent portion of the tongue of pulling leader 43a and is connected to that tongue in the same manner at joint 52b.

To load the film pack into the camera 53 shown in FIG. 1, the camera cover door 54 is opened and the film pack is installed in chamber 55 in the camera body member 56 with body member lip 57 received in exposure opening 22 to provide a light-tight joint between the interior of the film pack casing and the camera bellows 58. When the camera door is closed and latched by an appropriate latch member, not shown, a leaf spring 59 on the door biases the film pack forwardly against the adjacent surface of the camera body member to locate the inner surface of front wall member 23 in coincidence with a focal plane of the camera lens system supported in lens housing 61. Additionally, closing the cover door brings a rotatable pressure roller 62 mounted thereon into contact with the leading end of the mask strip directly opposite spring loaded pressure pad 63 mounted in the camera body member.

After the camera has been loaded, the photographer grasps the end of the mask strip protruding from the camera through opening 64 and pulls it away from the camera. This causes the trailing end of the mask strip to tear free from staple 51 so that the mask strip can be withdrawn as that staple maintains the two photosensitive sheets in their respective initial positions. Since the leading end of pulling leader 43a is attached to the mask strip, the initial movement of the latter draws the leading end of that pulling leader between roller 62 and pressure pad 63. When the leading end of pulling leader 43a has emerged from the camera to the position shown in FIG. 6, all of the available slack in that leader has been absorbed so that it cannot move further without also moving the corresponding photosensitive sheet 33a, which is still secured to pressure plate 26 by staple 51. The connection 52a between the mask strip and the leading end of pulling leader 43a is made only strong enough to ensure that the leading end of the pulling leader is withdrawn from the camera but not strong enough to pull film unit 32a free of staple 51. This is accomplished by proper selection of the area and nature of the adhesive bond connecting the pulling leader to the mask strip and is facilitated by the fact that the end of the pulling leader is folded back on itself after it emerges from the camera, thereby providing a reverse bend connection which is separated by a peeling force rather than simply by a straight shearing force. After the joint between the mask strip and pulling leader 43a has been broken or separated, the photographer continues to pull on the mask strip until it is removed entirely from the camera. With the mask strip removed, pressure plate 26 biases the photosensitive sheets forwardly so that the marginal regions of sheet 33a bear against the inner surface of the front casing wall 23 surrounding exposure opening 22, thus locating the image area of that sheet in coincidence with a focal plane of the camera's lens system.

After sheet 33a has been exposed, the accessible end of pulling leader 43a is grasped and pulled in the same manner in which the mask strip was removed, thereby causing trailing strip 34a to tear free from staple 51 to allow the exposed photosensitive sheet 33a to move toward the corresponding cover sheet 38a as the pulling leader 43b of film unit 32b is moved between roller 62 and pressure pad 63. After those two sheets have thus been sandwiched together, the continuing movement of pulling leader 43a causes it to separate from pulling leader 43b in the same manner described above, without tearing the trailing strip of photosensitive sheet 33b free from staple 51. When the leading end of photosensitive sheet 33a reaches slot 46a in cover sheet 38a, both sheets then move together between roller 62 and pressure pad 63, as shown in FIG. 8, thereby effecting processing of the sheets as previously explained. Accordingly, film unit 32a is removed from the camera, leaving the leading end of pulling leader 43b in an accessible position so that it can be employed after sheet 33b is exposed to effect processing and withdrawal of film unit 32b. If additional units were loaded into the casing, it should be obvious that each such unit would be connected to the preceding one by the same type of pulling leader arrangement in the order that the removal of each film unit would bring the leading end of the pulling leader of the next film unit into accessible position.

FIGS. 9-11 show an alternate embodiment of the invention in which a film pack generally similar to the one illustrated in FIGS. 1-8 is loaded with a mask strip 65 and with two film units 66a and 66b. In this embodiment, however, the respective fluid processing pods 67a and 67b are carried by the extended leading ends of the photosensitive sheets 68a and 68b. Also, intermediate leaders 69a and 69b are connected to the leading ends of the respective cover sheets 71a and 71b and are provided with corresponding slot members 72a and 72b, one of which is shown in plan view in FIG. 11. The tongue portion 73a of pulling leader 74a passes through transverse slot 75a in slot member 72a and is releasably connected to mask strip 65. Similarly, the tongue portion of pulling leader 73b passes through transverse slot 75b in slot member 72b and is releasably attached to slot member 72a. Accordingly, each of the photosensitive sheets can be moved independently of the corresponding cover sheet by its pulling leader until those two sheets are superimposed, whereupon they are withdrawn between the pressure applying members and separated from the pulling leader of the subsequent film unit as previously described. However, since the slot members can be made of plastic or some other material considerably stronger than the cover sheet, this mode of construction provides a strengthened lost-motion connection between the two sheets of the film unit to minimize the possibility of the photosensitive sheet sliding relative to its cover sheet as those two sheets are pulled together between the pressure applying members.

FIG. 12 shows a modification of the film pack illustrated in FIGS. 9-11 in which both the tongue portion 73a of pulling leader 74a and the tapered leading end 76b of pulling leader 74b pass through the slot 75a in slot member 72a. This arrangement allows the tip of pulling leader 73b to be releasably attached directly to pulling leader 73a rather than to slot member 72a, thereby simplifying the production of the film assemblage. Alternatively, the slot members incorporated in this film pack embodiment can be of the form illustrated in FIG. 13, comprising two opposed ears 77 which define an open sided transverse slot 78 corresponding to slot 47 shown in FIG. 5. It will also be noted that the slot members shown in FIG. 12 are depicted as being folded toward the casing slot 24 rather than lying in the opposite direction as illustrated in FIG. 9; but it should be understood that this detail is optional, depending on considerations of simplifying the assembly of the film pack unit.

The invention has been described in detail with particular reference to illustrative preferred embodiments thereof, but it will be understood that variations and modifications can be effected within the spirit and scope of the invention as described hereinabove and as defined in the appended claims.

I claim:

1. A film pack including an assemblage of interconnected self-processing film units for use in a camera, the camera having pressure-applying members between which the units are adapted to be withdrawn for initiating processing of the units, the pack comprising:

a casing for containing said film units and including means through which said units sequentially can be exposed in said casing and withdrawn from said casing;

first and second units in said casing, each including means defining first and second spaced sheets at least a major portion of each of which are arranged in substantially flat relationship in said casing, one of said sheets including a photosensitive layer located in said casing, and the other of said sheets being adapted to be registered with said one sheet during processing; said second sheet including means defining an elongate aperture adjacent one end of said sheet; and leader means interconnecting both of said first and second sheets of each unit and said first and second units, said leader means having a first end connected to said first sheet of said first unit and extending therefrom to pass through said aperture in said second sheet of said first unit, said leader means having a second end strippably coupled within said casing to said second unit by means for withdrawing said second leader end from said casing for threading between the camera pressure members and then for stripping said second leader end from said second film unit in response to the withdrawal of said second film unit from said casing and between the members.

2. A film assemblage including a plurality of self-processing film units sequentially removable from the assemblage, at least one of said units comprising:
   first and second elements, one of said elements including a photosensitive portion adapted to be exposed and for recording a latent image representing said exposure, and the other of said elements being spaced apart from said one element and adapted to be registered with said one element, said second element including means defining a cut-out portion;
   a leader in said assemblage and having leading and trailing ends, said trailing end of said leader being coupled to said first element and extending therefrom through said cut-out portion of said second element, said leader being movable relative to said second element in a predetermined direction and by a predetermined amount through said cut-out portion to transport said first element into registration with said second element, and thereafter being substantially immovable relative to said second element in said predetermined direction for transporting both of said elements from said assemblage in registration; and
   means coupling said leading end of said leader to another of said film units for withdrawing said leader from said assemblage and then for separating said coupling in response to the removal of said another film unit from the assemblage.

3. An assemblage as claimed in claim 2, wherein said cut-out portion defines an elongated slot bounded on all sides by said second element.

4. An assemblage as claimed in claim 2, wherein said cut-out portion defines a generally C-shaped slot partially open along one side.

5. A film pack comprising:
   a generally rectangular box-like casing provided with an elongate opening at one end thereof and with a front wall member including an exposure opening;
   a pressure plate within said casing dividing the interior thereof into a first compartment adjacent said exposure opening and a second compartment;
   first and second film units, each of which includes a photosensitive sheet in said first compartment, a second sheet in said second compartment, a leader having a trailing portion narrower than one of said sheets and attached at its trailing end to said one sheet, and lost-motion connecting means defining a slot associated with the other of said sheets, said slot being disposed transversely of said other sheet and being shorter than the width of said one sheet, said trailing portion of said leader being received freely through said slot to thereby allow said leader to move said photosensitive and second sheets into sandwiched relation and then to move both of said sheets in unison by virtue of the inability of said one sheet to pass through said slot; and
   means releasably coupling said leading end of said leader of said second film unit to said first film unit at a point remote from said leading end of said leader of the first film unit to provide an assemblage of said first and second film units.

6. A film pack according to claim 5 in which said slot defined by said connecting means is in said second sheet.

7. A film pack according to claim 5 in which said slot defined by said connecting means is open along its center portion to said leading end of said one sheet.

8. A film pack according to claim 5 in which said lost-motion connecting means comprises:
   a slot member provided with said elongate slot, said slot member being formed of a material of greater strength than said one sheet; and
   a flexible connecting member inseparably connecting said slot member with said leading end of said one sheet.

9. A film pack according to claim 8 in which said connecting member comprises plastic material.

10. A film pack according to claim 8 in which said leading end of said leader of said second film unit extends through said slot in said slot member of said first film unit with said leader of said first film unit, said leader of said second film unit being attached at its leading end to said leader of said first film unit at a point remote from said leading end of said last-mentioned leader by joint means for separating after said first film unit is withdrawn from said pack.

11. A film pack according to claim 8 wherein said assemblage includes:
   an opaque mask strip defining leading and trailing portions and being initially disposed with its trailing portion located between said exposure opening and said photosensitive sheet of said first film unit within said forward casing compartment and with its leading portion extending along the rearward face of said second sheet of said first film unit in said rearward casing compartment and emerging from said casing through said elongate opening; and
   second coupling means releasably coupling said leading end of said leader of said first film unit to said mask strip within said casing at a point remote from the leading end of said mask strip.

* * * * *